(12) United States Patent
Liao

(10) Patent No.: US 6,619,449 B2
(45) Date of Patent: Sep. 16, 2003

(54) WIRE WINDING BOX WITH A CHARGING UNIT

(76) Inventor: Sheng Hsin Liao, No. 10, Alley 38, Lane 229, San Chun St., Shulin, Taipei Hsien (TW)

( * ) Notice: Subject to any disclaimer, the term of this patent is extended or adjusted under 35 U.S.C. 154(b) by 105 days.

(21) Appl. No.: 09/870,666

(22) Filed: Jun. 1, 2001

(65) Prior Publication Data
US 2002/0166743 A1 Nov. 14, 2002

(30) Foreign Application Priority Data
May 14, 2001 (TW) ..................................... 90207825 U (51) Int. Cl.[7] ................................................. H02G 11/00
(52) U.S. Cl. ........................ 191/12.2 R; 322/1; 320/114
(58) Field of Search ......................... 322/1, 4; 320/114; 290/1 A; 191/12.2 R, 12.4, 12.2 A (56) References Cited

U.S. PATENT DOCUMENTS

| | | | | |
|---|---|---|---|---|
| 4,182,967 A | * | 1/1980 | Jordan | 310/74 |
| 4,893,037 A | * | 1/1990 | Schwartz | 310/68 B |
| 5,917,310 A | * | 6/1999 | Baylis | 322/1 |
| 5,949,215 A | * | 9/1999 | Takakura | 320/114 |
| 6,127,803 A | * | 10/2000 | Wang et al. | 320/114 |
| 6,133,642 A | * | 10/2000 | Hutchinson | 290/1 A |
| 6,293,771 B1 | * | 9/2001 | Haney et al. | 417/374 |
| 6,316,906 B1 | * | 11/2001 | Lozada | 320/101 |
| 6,420,849 B2 | * | 7/2002 | Murphy | 320/114 |

* cited by examiner

Primary Examiner—Mark T. Le
(74) Attorney, Agent, or Firm—Rosenberg, Klein & Lee (57) ABSTRACT

A wire winding box with a charging unit comprises a casing, a rotary disk, a spiral spring, a communication wire, a charging unit and a generator. The casing has a receiving groove therewithin. The rotary disk is pivotally installed in the receiving groove. The spiral spring is installed between the casing and the rotary disk. The communication wire winds around the rotary disk, and one end of the communication wire passes out of the casing. The charging unit is installed within the casing and formed by a gear set and a generator; and the gear set is installed between the rotary disk and the generator. Thereby, when the communication wire is pulled, the power from the rotary disk is transferred to the generator through the gear set, so that the generator can generate power.

10 Claims, 7 Drawing Sheets

WIRE WINDING BOX WITH A CHARGING UNIT

FIELD OF THE INVENTION

The present invention relates to a wire winding box with a charging unit, and especially to a wire winding box for generating power and capable of being utilized widely.

BACKGROUND OF THE INVENTION

Currently, computers, modems, telephones, fax machines, and other communication devices need various communication wires for connecting different devices. To avoid a too long communication wire from winding improperly, there are various wire winding boxes being developed for winding a communication wire in order.

Figure 1:
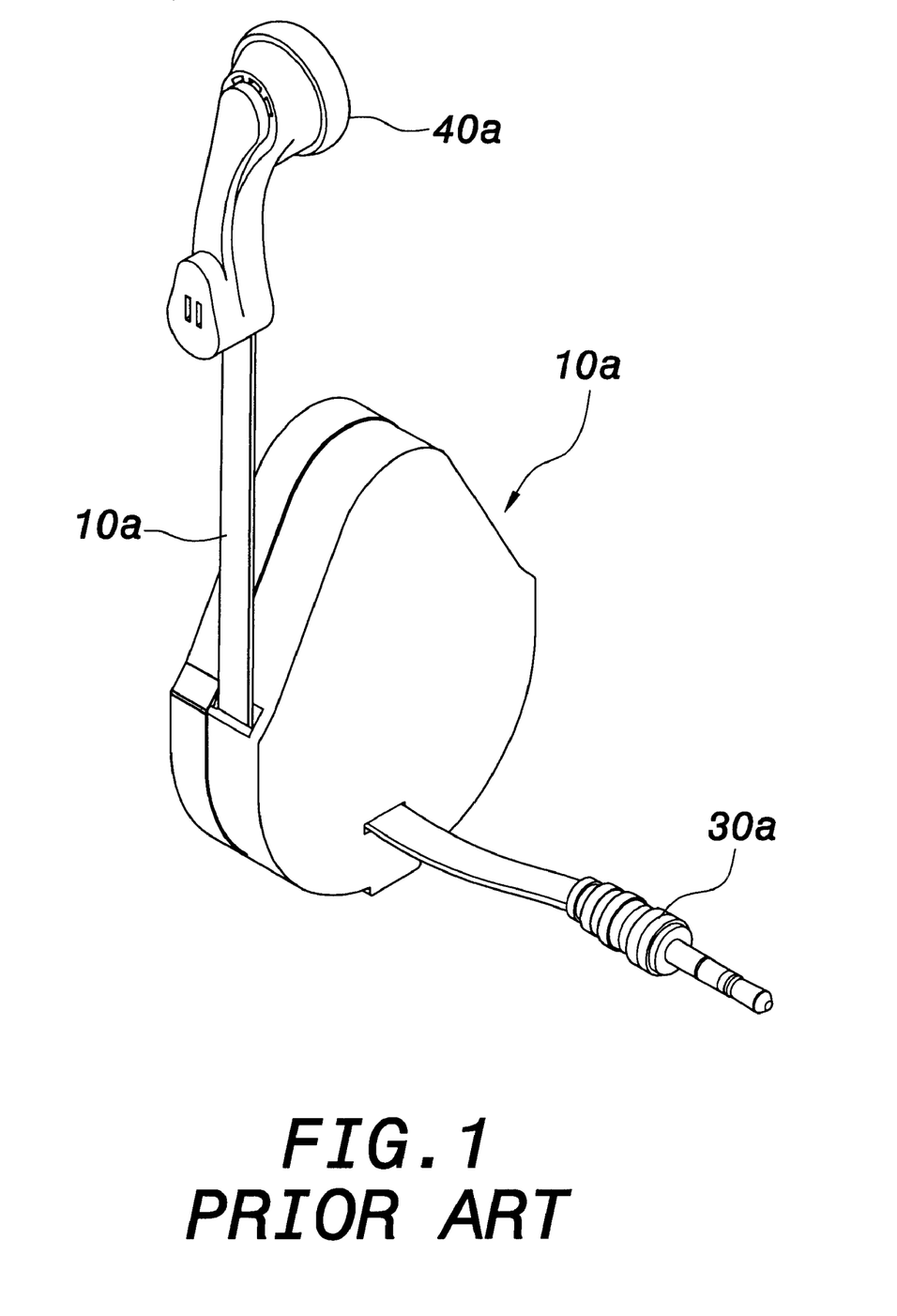
FIG. 1 is a perspective view of the prior art.

Referring to FIG. 1, a prior art wire winding box is illustrated. A communication wire 20 is elastically installed in the casing 10a. Two wire ends of the communication wire 20a may be connected to various plugs or other devices according to the communication device to be connected to, such as the sound plug 30a or earphone or hand-free earphone 40 with a microphone, etc.

Besides, in the conventional wire winding box, as a communication wire is pulled out, the communication wire is tensioned tightly by the strong elastic force of a spiral spring so as not to retain a proper length to be exposed out. This is a big trouble to the user. Therefore, there is a wire winding box which can be positioned in a communication wire, in that, an elastic swinging piece is used to match the notch and buckling groove so as to provide the functions of winding and positioning.

SUMMARY OF THE INVENTION

Accordingly, the primary object of the present invention is to provide a wire winding box with a charging unit, wherein other than winding a communication wire to be in order, a charging unit is used to generate power in the process of pulling a communication wire so as to provide the functions of power generation, charging and supplying power. Therefore, it can be used to charge and enable a handset or other communication device.

Another object of the present invention is to provide a wire winding box with a charging unit, wherein a circuit board is installed therein. The circuit therein can be modified as desired for providing the function of illumination, alerting, receiver, etc., so that the wire winding box can be utilized widely.

The various objects and advantages of the present invention will be more readily understood from the following detailed description when read in conjunction with the appended drawings.

DETAILED DESCRIPTION OF THE PREFERRED EMBODIMENTS

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 2:
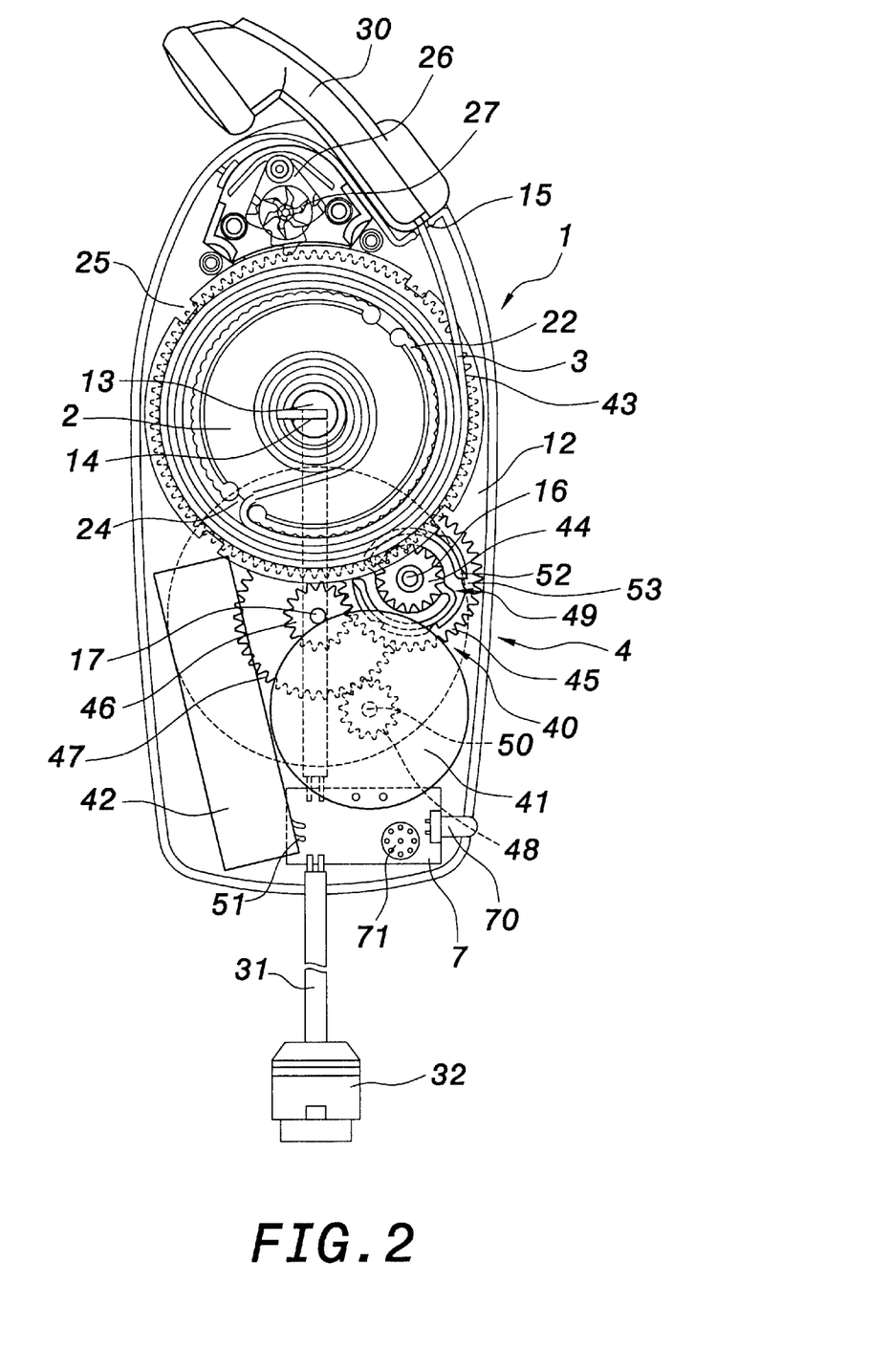
FIG. 2 is a plane schematic view of the present invention.
Figure 3:
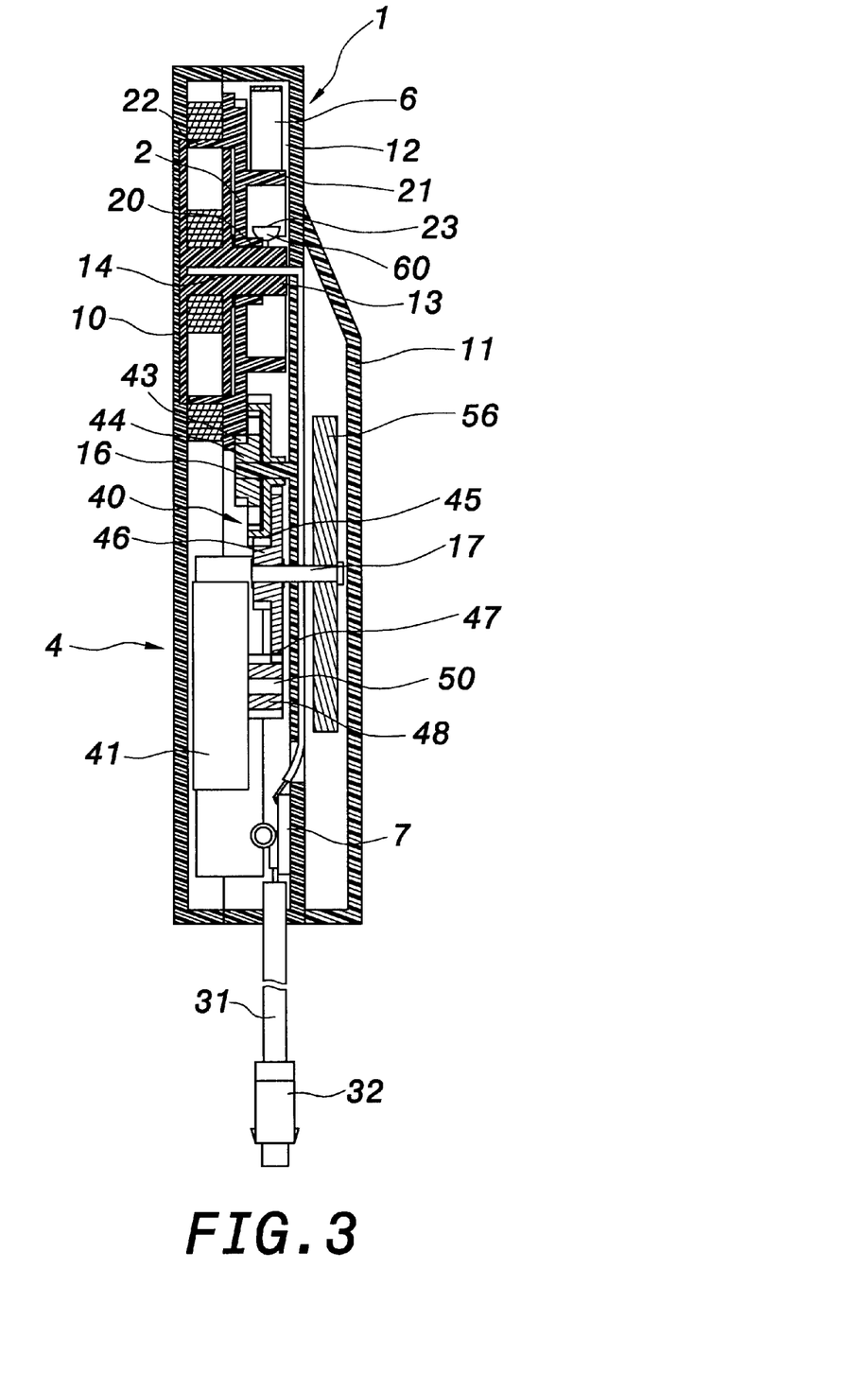
FIG. 3 is a cross sectional view of the present invention.

Referring to FIGS. 2 and 3, the wire winding box with a charging unit of the present invention is illustrated. The wire winding box with a charging unit comprises a casing 1, a rotary disk 2, a communication wire 3, and a charging unit 4.

The casing 1 is formed by a first case half 10 and a second case half 11. A receiving groove 12 is formed therein. A pivotal shaft 13 is installed with in the receiving groove 12. Lateral sides of the pivotal shaft 13 and the casing 1 are installed with a wire groove 14 and a wire outlet 15. The receiving groove 12 is further installed with a rotary disk 2 pivotally. The rotary disk 2 has a pivotal hole 20 for being pivotally engaged with the pivotal shaft 13 to be rotated therein. The disk surface at two sides thereof are installed with a first ring 21 and a second ring 22. The first ring 21 is installed with a hook slot 23 for being buckled by a hook 60 of a spiral spring 6 at an outer side of the rotary disk 2. Thereby the spiral spring 6 is installed between the casing 1 and the rotary disk 2 so as to provide elasticity to restore the rotary disk 2 as it is rotated. The second ring 22 is installed with a slot 24.

One wire end of the communication wire 3 passes through the wire groove 14 of the pivotal shaft 13, and then is wound around the pivotal shaft 13 through several circles, and then is placed into the rotary disk 2. Then the rotary disk 2 rotates, so that the communication wire 3 passes through the slot 24 of the second ring 22 winds around the second ring 22. Then, it is protruded out from the wire outlet 15 of the casing 1. Furthermore, the hook 60 of the spiral spring 6 is hooked to the hook slot 23.

The two wire ends of the communication wire 3 can be connected to various plugs according to the electronic devices, such as plugs, earphones, microphones or other device, to be connected to. Referring to FIG. 2, one wire end of the communication wire 3 is connected to a hand-free earphone 30, and another end of the communication wire 3 is connected to a circuit board 7 installed at the casing 1. The circuit board 7 is further connected to a plug 32 through a connecting wire 31, so that the two wire ends of the communication wire 3 are connected to the hand-free earphone 30 and the plug 32.

Figure 4:
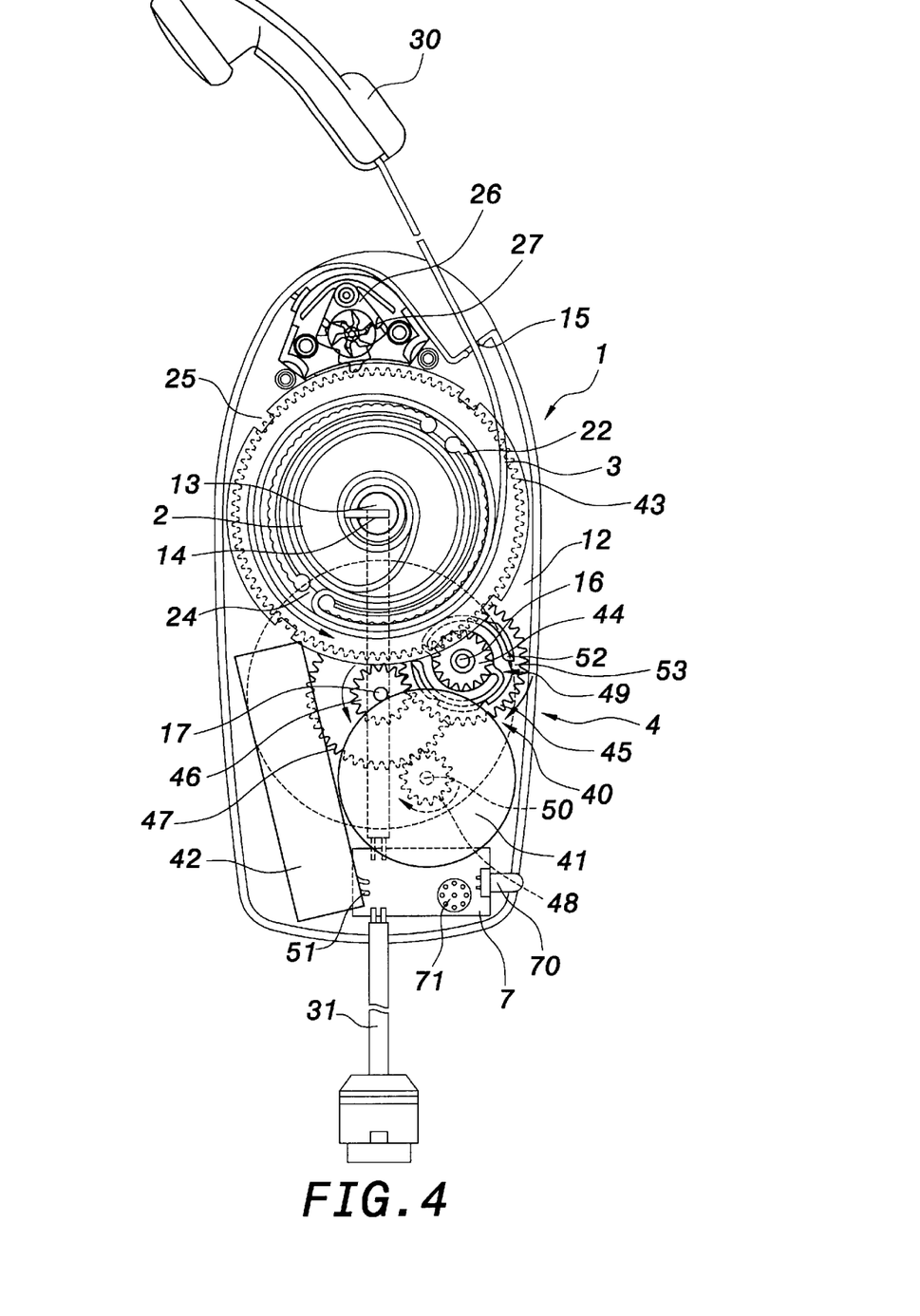
FIG. 4 is a schematic view showing the application of the present invention.

With reference to FIG. 4, a practical application of the present invention is illustrated. The wire winding box can be used to receive the communication wire 3 of a certain length. As the plug 32 of the communication wire 3 is inserted into the receptacle of a related communication device for loading information. The communication wire 3 can be connected to one end of the hand-free earphone 30 and is pulled out from a wire winding box directly. The communication wire 3 is interacted by the spiral spring 6 in the wire winding box to be retained with a restoring force continuously, so that the communication wire 3 can be rewound to the box successfully. No wire is exposed.

Moreover, to prevent the communication wire 3 from affecting by the communication wire 3 as it is pulled out, the periphery of the rotary disk 2 is installed with a plurality of buckling grooves 25. A freely swinging piece 26 is installed at the rotary disk 2 and a ratchet 27 freely rotating. By the special interactions between the swinging piece 26 and the buckling grooves 25 of the rotary disk 2, the communication wire 3 can be fixed or rewound by being pulled or restored.

In the present invention, a charging unit 4 is installed in the casing 1. The charging unit 4 is formed by a gear means 40, a generator 41, and a battery 42. The gear means 40 is installed between the rotary disk 2 and the generator 41, so that as the rotary disk 2 rotates, the dynamic force generated can be transferred to the generator 41 through the gear means 40. The gear means 40 is formed by a first gear 43, a second gear 44, a third gear 45, a fourth gear 46, a fifth gear 47, and a sixth gear 48 (referring to FIG. 6). The first gear 43 is connected to the rotary disk 2. The second gear 44 is coaxial with the third gear 45 and is pivotally installed to a second shaft 16 in the casing 1, so that the second gear 44 and third gear 45 can rotate. The first gear 43 is engaged with the second gear 44, so that the power can be transferred to the second gear 44 through the first gear 43. A check means 49 is installed between the second gear 44 and the third gear 45 (referring to FIG. 5), so that the power is unidirectionally transferred to the third gear 45 through the second gear 44. As the second gear 44 rotates inversely, the power will not be transferred to the third gear 45.

Figure 6:
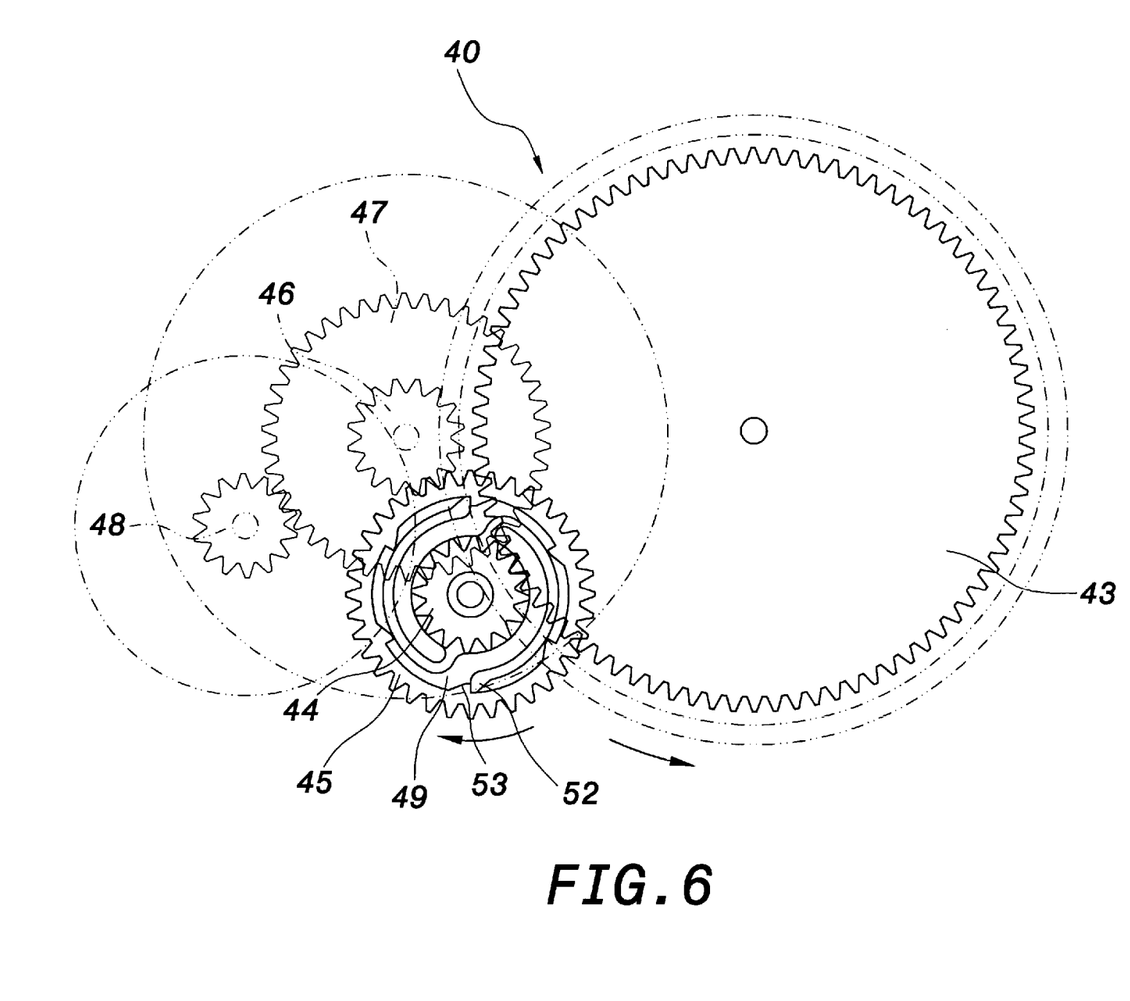
FIG. 6 is a schematic view showing the first operation of the check means of the present invention.

The fourth gear 46 and the fifth gear 47 are connected as an integral body, which are coaxially fixed to the second shaft 17 in the casing 1. The second shaft 17 is pivotally installed to the casing 1, so that the fourth gear 46 and the fifth gear 47 can rotate. The fourth gear 46 and the third gear 45 are engaged, so that power can be transferred to the fourth gear 46 and fifth gear 47 through the third gear 45. The generator 41 is fixed to the interior of the casing 1. The sixth gear 48 is connected to the power input shaft 50 of the generator 41. The sixth gear 48 is engaged to the fifth gear 47, thereby, power can be transferred to the sixth gear 48 through the fifth gear 47 and then is inputted to the generator 41, so that the generator 41 can generate power. The generator 41 is connected to the circuit board 7 through the connecting wire 51, thereby, the power generated by the generator 41 being transferred to the circuit board 7 and the plug 32.

Another end of the second shaft 17 fixed to the fourth gear 46 and the fifth gear 47 is fixed with a flywheel 56. By the inertia of the rotation of the flywheel 56, the power transformation of the gear means 40 is stable. As the user pulls the communication wire 3, the operation time of the charging unit 4 can be prolonged. It is unnecessary to pull the charging unit 4 continuously to charge the battery.

Figure 5:
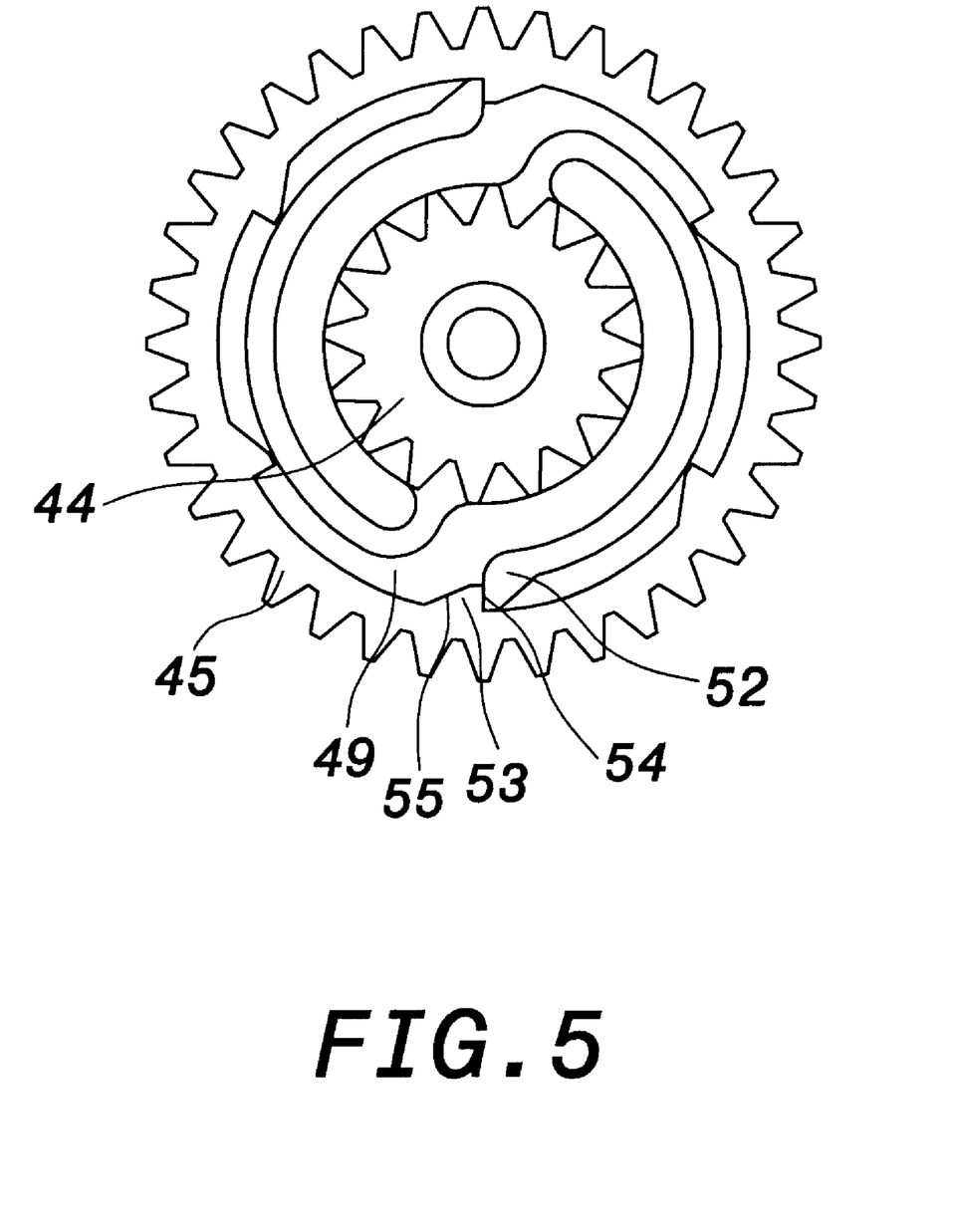
FIG. 5 is a plane schematic view of the check means of the present invention.

Referring to FIG. 5, in the present invention, a check means 49 is installed between the second gear 44 and the third gear 45. The check means 49 is formed by a plurality of palms 52 connected at an outer edge of the second gear 44 and a plurality of unidirectional stoppers 53 at the inner edge of the third gears 45. The unidirectional stoppers 53 each have a pushing surface 54 and a tilt sliding surface 55.

Referring to FIGS. 4 and 6, when the communication wire 3 is pulled out from a wire winding box, the rotary disk 2 will drive the first gear 43 of the gear means 40, so that the power can be transferred through the first gear 43, second gear 44, third gear 45, fourth gear 46, fifth gear 47, and sixth gear 48 to the generator 41, so that the generator 41 may generate power and then the power is stored to the battery 42.

With reference to FIGS. 4 and 6, as the second gear 44 rotate along a direction (clockwise), the plurality of palms 52 of the second gear 44 may resists against the pushing surface of the unidirectional stopper 53 for pushing the third gear 45 to rotate synchronously. Then, the power is transferred to the third gear 45 through the second gear 44.

Figure 7:
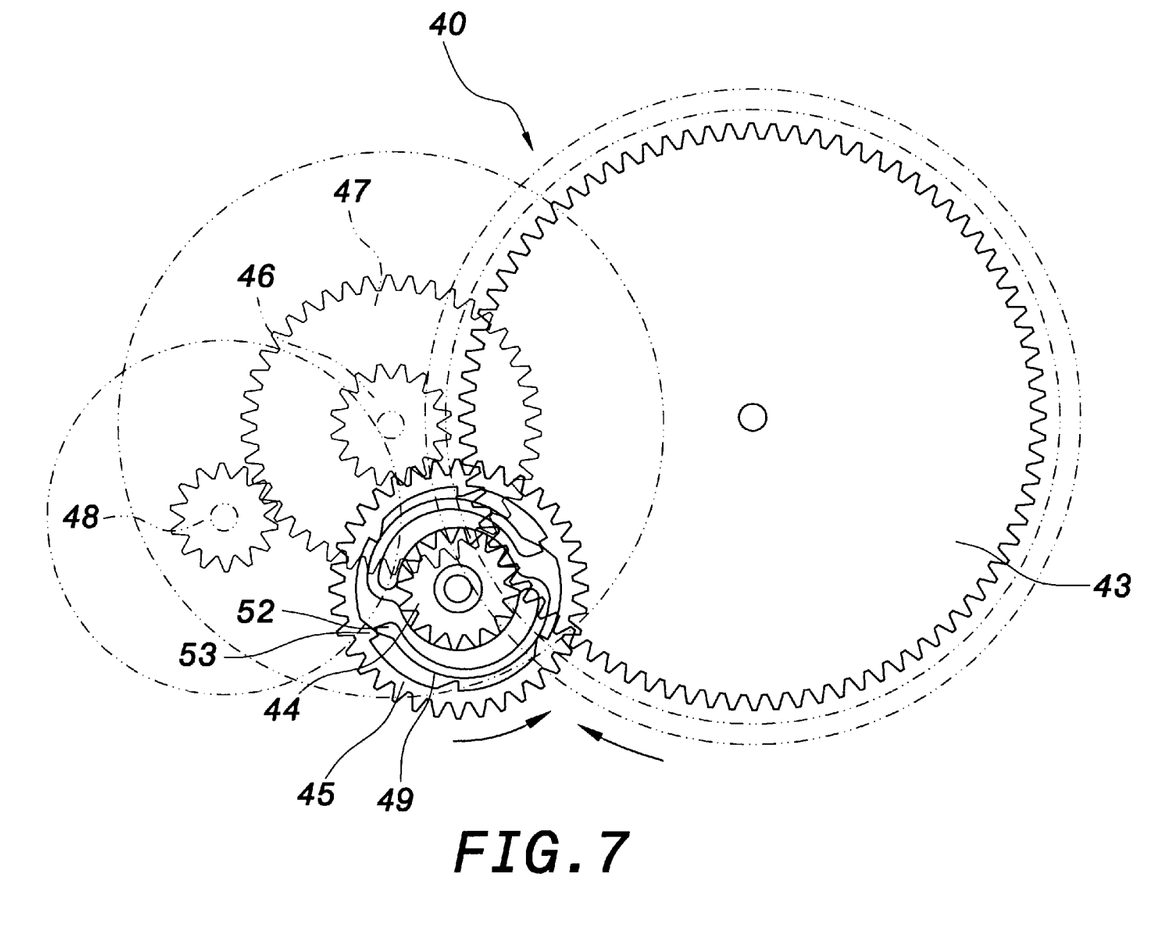
FIG. 7 is a schematic view showing the second operation of the check means of the present invention.

Referring to FIGS. 5 and 7, on the contrary, as the communication wire 3 is acted by the spiral spring 6 in the wire winding box so as to be retained with a restoring tension, so that the communication wire 3 can be rewound back to the box, and the first gear 43 will drive the second gear 44 to rotate along another direction (counterclockwise), then the plurality of palms 52 will contact and slide through the sliding surface 55 of the unidirectional stopper 53, so that the power will not be transferred to the third gear 45. Therefore, the power only passes through the second gear 44 to the third gear 45 unidirectionally. When the second gear 44 rotates along a reverse direction, the power will be interrupted and thus does not be transferred to the third gear 45.

In the present invention, other than the fundamental function that the wire winding box may wind and receive the communication wire 3, in the process of pulling the commmunication wire 3, the charging unit 4 can be used to generate power. Therefore, it has the functions of generating power, charging, and providing power. As a result, the plug 32 can be used to be connected to a handset or other communication devices for charging and providing power.

Moreover, in the present invention, the generator 41 can be directly connected to a battery system of a communication device (for example, a personal digital assist (PDA) or a handset), thereby, power from the generator 41 being transferred to the battery system of the communication device. Consequently, the battery may be neglected.

Moreover, the wire winding box has the functions of generating power, charging and supplying power, and therefore, the circuit board 7 may be installed therein. The circuit board 7 may be designed as desired, so that the power from the generator 41 is converted into various voltages or currents. The circuit board 7 can be installed with light emitting element 70, for example light emitting diodes or bubbles for providing illumination. Another sound emitting element 71, for example, buzzer, is installed in the circuit board 7 for providing the function of alarming or receiver. Therefore, the wire winding box of the present invention has many functions.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A wire winding box with a charging unit comprising:
   a casing having a receiving groove therewithin;
   a rotary disk pivotally installed in the receiving groove;
   a spiral spring installed between the casing and the rotary disk;
   a communication wire winding around the rotary disk, the communication wire providing a path for a signal being conveyed therethrough, one end of the communication wire passing out of the casing and coupled to an external circuit; and
   a charging unit installed within the casing and formed by a gear means and a generator, the gear means being installed between the rotary disk and the generator, whereby power from the rotary disk is transferred to the generator through the gear means when the communication wire is pulled.

2. The wire winding box with a charging unit as claimed in claim 1, wherein the external circuit coupled to the communication wire is an earphone or a microphone.

3. The wire winding box with a charging unit as claimed in claim 1, wherein the gear means of the charging unit is formed by a plurality of gears, one of the gears is connected to a rotary disk, another gear is connected to a power input shaft of the generator, while other gears are connected between the two gears.

4. The wire winding box with a charging unit as claimed in claim 1, wherein the gear means of the charging unit is installed with a flywheel.

5. The wire winding box with a charging unit as claimed in claim 1, wherein the charging unit is installed with a battery for storing power generated by the generator.

6. The wire winding box with a charging unit as claimed in claim 1, wherein the generator of the charging unit is connected to a battery system of a communication device, so that the power of the generator is transferred to the battery system of the communication device.

7. A wire winding box with a charging unit comprising:

a casing having a receiving groove therein;

a rotary disk pivotally installed in the receiving groove, a disk surface of one side of the rotary disk installed with a second ring;

a spiral spring installed between the casing and the rotary disk;

a communication wire winding around the rotary disk, one end of the communication wire passing out of the casing;

a charging unit installed within the casing and formed by a gear means and a generator, the gear means being installed between the rotary disk and the generator, whereby when the communication wire is pulled, the power from the rotary disk is transferred to the generator through the gear means, so that the generator generates power; and a pivotal shaft installed within the receiving groove of the casing, lateral sides of the pivotal shaft and the casing installed with a wire groove and a wire outlet, respectively, the rotary disk having a pivotal hole for being pivotally engaged with the pivotal shaft to be rotated thereon, wherein the end of the communication wire passing out of the wire groove of the pivotal shaft is wound around the pivotal shaft and the second ring to expose the communication wire at the wire outlet of the casing.

8. A wire winding box with a charging unit comprising:

a casing having a receiving groove therein;

a rotary disk pivotally installed in the receiving groove, a periphery of the rotary disk installed with a plurality of buckling grooves;

a spiral spring installed between the casing and the rotary disk;

a communication wire winding around the rotary disk, one end of the communication wire passing out of the casing;

a charging unit installed within the casing and formed by a gear means and a generator, the gear means being installed between the rotary disk and the generator, whereby, when the communication wire is pulled, the power from the rotary disk is transferred to the generator through the gear means, so that the generator generates power; and a freely swinging piece installed at the rotary disk around a freely rotating ratchet, by the engagement between the swinging piece and the buckling grooves of the rotary disk, the communication wire is fixed or rewound by being pulled.

9. A wire winding box with a charging unit comprising:

a casing having a receiving groove therein;

a rotary disk pivotally installed in the receiving groove;

a spiral spring installed between the casing and the rotary disk;

a communication wire winding around the rotary disk, one end of the communication wire passing out of the casing;

a charging unit installed within the casing and formed by a gear means and a generator, the gear means being installed between the rotary disk and the generator, whereby, when the communication wire is pulled, the power from the rotary disk is transferred to the generator through the gear means, so that the generator generates power; and a circuit board installed in the casing and connected to one end of the communication wire, the generator being connected to the circuit board through a connecting wire, the circuit board being connected to a plug by another connecting wire, the circuit board being installed with light emitting elements or sound emitting elements.

10. A wire winding box with a charging unit comprising:

a casing having a receiving groove therein;

a rotary disk pivotally installed in the receiving groove;

a spiral spring installed between the casing and the rotary disk;

a communication wire winding around the rotary disk, one end of the communication wire passing out of the casing;

a charging unit installed within the casing and formed by a gear means and a generator, the gear means being installed between the rotary disk and the generator, whereby, when the communication wire is pulled, the power from the rotary disk is transferred to the generator through the gear means, so that the generator generates power; and a check means installed between a second gear and a third gear of the gear means, the check means including a plurality of palms connected at an outer edge of the second gear and a plurality of unidirectional stoppers at an inner edge of the third gear, the unidirectional stoppers each have a pushing surface and a tilt sliding surface such that when the second gear is rotated in a first direction, the palms will resist against the pushing surface of one of the unidirectional stoppers to push the third gear to rotate and when the second gear rotates in a second direction opposite to the first direction, the palm slides through the sliding surface of one of the unidirectional stoppers, so that the power is not transferred to the third gear.

* * * * *